United States Patent
Matsuda

(10) Patent No.: US 9,772,683 B2
(45) Date of Patent: Sep. 26, 2017

(54) INFORMATION PROCESSING APPARATUS TO PROCESS OBSERVABLE VIRTUAL OBJECTS

(75) Inventor: Kouichi Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 66 days.

(21) Appl. No.: 13/266,301

(22) PCT Filed: Mar. 17, 2010

(86) PCT No.: PCT/JP2010/054542
§ 371 (c)(1),
(2), (4) Date: Jan. 9, 2012

(87) PCT Pub. No.: WO2010/125868
PCT Pub. Date: Nov. 4, 2010

(65) Prior Publication Data
US 2012/0092333 A1    Apr. 19, 2012

(30) Foreign Application Priority Data
Apr. 28, 2009    (JP) .............................. P2009-108777

(51) Int. Cl.
*G06T 15/00*    (2011.01)
*G06F 3/01*    (2006.01)
(Continued)

(52) U.S. Cl.
CPC ............ *G06F 3/011* (2013.01); *G06F 3/0481* (2013.01); *G06T 19/00* (2013.01); *G06T 19/006* (2013.01)

(58) Field of Classification Search
None
See application file for complete search history.

(56) References Cited

U.S. PATENT DOCUMENTS 6,771,294 B1 * 8/2004 Pulli et al. .................... 715/863
2006/0058065 A1 * 3/2006 Shen .................. H04M 1/2745
455/558

(Continued)

FOREIGN PATENT DOCUMENTS

| JP | 2002-247602 | 8/2002 |
| JP | 2003-256876 | 9/2003 |

(Continued)

OTHER PUBLICATIONS

Holger Regenbrecht, Gregory Baratoff, Michael Wagner, A tangible AR desktop environment, Computers & Graphics, vol. 25, Issue 5, Oct. 2001, pp. 755-763, ISSN 0097-8493.*

(Continued)

*Primary Examiner* — Yu Chen
(74) *Attorney, Agent, or Firm* — Chip Law Group

(57) ABSTRACT

A configuration is provided in which data that is not displayed on a display is always observable as an virtual object. For example, in data processing using a PC, data that is not displayed on the display of the PC, such as data having been cut or copied, can be set as a virtual object and pasted on a finger of a hand of a user or the like to be always observable. According to this configuration, data that is not displayed on the display area of the PC can be pasted on a space other than the display area of the PC and displayed to be observable, which allows improving of the efficiency of data processing.

9 Claims, 11 Drawing Sheets

(51) Int. Cl.
*G06F 3/0481* (2013.01)
*G06T 19/00* (2011.01)

(56) References Cited

U.S. PATENT DOCUMENTS

| | | | |
|---|---|---|---|
| 2007/0002037 A1 | 1/2007 | Kuroki et al. | |
| 2010/0156836 A1* | 6/2010 | Katayama | G01S 5/16 345/173 |
| 2010/0208033 A1* | 8/2010 | Edge et al. | 348/46 |
| 2011/0007035 A1* | 1/2011 | Shai | G06F 3/014 345/179 |

FOREIGN PATENT DOCUMENTS

| | | |
|---|---|---|
| JP | 2006-154902 | 6/2006 |
| JP | 2007-042073 | 2/2007 |
| JP | 2008-304269 | 12/2008 |
| JP | 2008-304288 | 12/2008 |

OTHER PUBLICATIONS

Stefan Winkler ; Hang Yu ; ZhiYing Zhou; Tangible mixed reality desktop for digital media management. Proc. SPIE 6490, Stereoscopic Displays and Virtual Reality Systems XIV, 64901S (Mar. 5, 2007).*

Xinlei Chen, Hideki Koike, Yasuto Nakanishi, Kenji Oka, and Yoichi Sato. 2002. Two-handed drawing on augmented desk system. In Proceedings of the Working Conference on Advanced Visual Interfaces (AVI '02), Maria De Marsico, Stefano Levialdi, and Emanuele Panizzi (Eds.). ACM, New York, NY, USA, 219-222.*

Lee, Taehee, and Tobias Hollerer. "Handy AR: Markerless inspection of augmented reality objects using fingertip tracking." Wearable Computers, 2007 11th IEEE International Symposium on. IEEE, 2007.*

Chen et al. (Two-handed drawing on augmented desk system, In Proceedings of the Working Conference on Advanced Visual Interfaces (AVI '02), ACM, New York, NY, USA, 219-222, 2002).*

Buchmann, Volkert, et al. "FingARtips: gesture based direct manipulation in Augmented Reality." Proceedings of the 2nd international conference on Computer graphics and interactive techniques in Australasia and South East Asia. ACM, 2004.*

European Search Report for Application No. 10769568.6-1960 / 2426578, PCT/JP2010054542 dated Mar. 6, 2013 from the European Patent Office.

Office Action for EP Patent Application No. 10769568.6, issued on Dec. 19, 2016, 6 pages of Office Action.

Regenbrecht, et al., "A Tangible AR Desktop Environment", Computers & Graphics, vol. 25, Issue 5, Oct. 2001, pp. 755-763.

Lee, et al., "Handy AR: Markerless Inspection of Augmented Reality Objects Using Fingertip Tracking", IEEE, 11th IEEE International Symposium on Wearable Computers, Oct. 11-13, 2007, 8 pages.

* cited by examiner

FIG.6

| VIRTUAL OBJECT PASTE POSITION INFORMATION | VIRTUAL OBJECT PASTE STATE INFORMATION |
|---|---|
| (1) LEFT THUMB | VIRTUAL OBJECT PASTED |
| (2) LEFT INDEX FINGER | VIRTUAL OBJECT PASTED |
| (3) LEFT MIDDLE FINGER | VIRTUAL OBJECT NOT PASTED |
| (4) LEFT RING FINGER | VIRTUAL OBJECT NOT PASTED |
| (5) LEFT LITTLE FINGER | VIRTUAL OBJECT NOT PASTED |
| .. | .. |

| | VIRTUAL OBJECT PASTE POSITION INFORMATION | VIRTUAL OBJECT PASTE STATE INFORMATION | PASTED VIRTUAL OBJECT |
|---|---|---|---|
| (1) | (x1,y1,z1) | VIRTUAL OBJECT PASTED | Change |
| (2) | (x2,y2,z2) | VIRTUAL OBJECT PASTED | Yes, we can |
| (3) | (x3,y3,z3) | VIRTUAL OBJECT PASTED |  |
| (4) | (x4,y4,z4) | VIRTUAL OBJECT NOT PASTED | |
| (5) | (x5,y5,z5) | VIRTUAL OBJECT NOT PASTED | |
| .. | .. | .. | .. |

INFORMATION PROCESSING APPARATUS TO PROCESS OBSERVABLE VIRTUAL OBJECTS

TECHNICAL FIELD

The present invention relates to an information processing apparatus, an information processing method and a program. More particularly, the present invention relates to an information processing apparatus, an information processing method and a program for performing data processing utilizing Mixed Reality (MR) that combines a real object in the real world with an electronic image.

BACKGROUND ART

For example, when a user performs data processing using a personal computer (PC), the user performs processing on data displayed on the display of the PC. As an example, the case of copying or cutting data is described here. In this case, the user specifies a string or an image area or the like displayed on the display, then inputs a command to perform cutting of the data or copying of the data to another area.

The processed data having been cut or copied in this way is stored in a memory in the PC, but may disappear from the display area in the course of processing. In order for the user to confirm the content of the processed data having been cut or copied, one of the following processings needs to be performed, for example:

(a) always displaying the processed data on a partial area of the display;

(b) storing the processed data in a copy buffer and, in response to a user operation, retrieving the data stored in the copy buffer to display on the display; or (c) in response to a user operation, pasting the processed data to a specified area of the display to display.

For example, by performing one of the above processings, the content of the processed data having been cut or copied can be confirmed.

However, in the above processings, the processing (a) needs to always display the processed data on the display, which occupies at least a partial area of the display. This may cause a problem of decreasing the main working area, e.g., the area of document creation screen, for the user to use on the display. The processing (b) needs a user operation for displaying the data stored in the copy buffer, causing a problem of increasing the processing load on the user. The processing (c) also needs a user operation and has a problem of needing an additional processing such as deleting or undoing when the processed data is mistakenly pasted.

The present invention is intended to solve the above problem through the use of data processing utilizing, for example, Mixed Reality (MR). For prior art regarding Mixed Reality, see Patent Document 1 (JP-A-2008-304268) and Patent Document 2 (JP-A-2008-304269), for example. These documents describe a processing of creating a 3D map of the real world utilizing camera-shot images.

PRIOR ART DOCUMENT

Patent Document

Patent Document 1: JP-A-2008-304268
Patent Document 1: JP-A-2008-304269

SUMMARY OF THE INVENTION

Problems to be Solved by the Invention

It is an object of the present invention to provide an information processing apparatus, an information processing method and a program that allows a spatial area other than a display for main working area to be effectively used by, for example, creating a combined image in which various data is electronically pasted to an area other than the display of a PC or the like and making the combined image observable, through data processing utilizing Mixed Reality (MR).

Means for Solving the Problems

A first aspect in accordance with the invention provides an information processing apparatus including:

a memory for storing processed data generated in data processing using a first display;

a 3D information analyzer for analyzing the 3D position of a real object included in a camera-shot image; and a virtual object manager for receiving analysis information input from the 3D information analyzer, determining a constituent part of the real object to be a virtual object display position and displaying on a second display a combined image in which the real object and the virtual object are combined, in which the virtual object manager, in response to a processing request input regarding the virtual object displayed on the second display, outputs data corresponding to the virtual object subject to the processing request to a data processor that performs data processing using the first display or a memory accessible to the data processor.

Furthermore, in one embodiment of the information processing apparatus of the invention, the information processing apparatus includes a communication section and performs communication with the data processor that performs data processing using the first display to transmit or receive data for data processing using the first display.

Furthermore, in one embodiment of the information processing apparatus of the invention, the 3D information analyzer includes a hand recognition module that recognizes each finger of a hand of a user included in the camera-shot image and analyzes the 3D position of the each finger of the hand of the user recognized by the hand recognition module, and the virtual object manager determines the position of the each finger of the hand of the user to be the virtual object display position and displays on the second display a combined image in which the virtual object is combined with the position of the each finger of the hand of the user.

Furthermore, in one embodiment of the information processing apparatus of the invention, the data stored in the memory is data having been cut or copied in the data processing using the first display.

Furthermore, in one embodiment of the information processing apparatus of the invention, the virtual object manager receives analysis information input from the 3D information analyzer, determines a constituent part of the real object included in the image displayed on the second display to be a virtual object display position and registers the determination information in a virtual object information management table.

Furthermore, in one embodiment of the information processing apparatus of the invention, the virtual object manager registers state information on whether or not a virtual object is displayed at the display position on the second display corresponding to the virtual object display position registered in the virtual object information management table.

Furthermore, in one embodiment of the information processing apparatus of the invention, the virtual object manager refers to the state information in the virtual object information management table to determine whether a new virtual object can be displayed or not and deletes the virtual object being displayed on the second display if requested by a user input.

Furthermore, a second aspect in accordance with the invention provides an information processing method performed in an information processing apparatus, the method including:

a step in which a controller stores processed data to be applied to data processing using a first display, in a memory;

a 3D information analysis step in which a 3D information analyzer analyzes the 3D position of a real object included in a camera-shot image;

a step in which a virtual object manager receives analysis information input from the 3D information analyzer, determines a constituent part of the real object to be a virtual object display position and displays on a second display a combined image in which the real object and the virtual object are combined; and a step in which, in response to a processing request input regarding the virtual object displayed on the second display, the virtual object manager outputs data corresponding to the virtual object subject to the processing request to a data processor that performs data processing using the first display or a memory accessible to the data processor.

Furthermore, a third aspect in accordance with the invention provides a program for causing an information processing apparatus to perform information processing, the program including:

a step of causing a controller to store processed data to be applied to data processing using a first display, in a memory;

a 3D information analysis step of causing a 3D information analyzer to analyze the 3D position of a real object included in a camera-shot image;

a step of causing a virtual object manager to receive analysis information input from the 3D information analyzer, to determine a constituent part of the real object to be a virtual object display position and to display on a second display a combined image in which the real object and the virtual object are combined; and a step of causing, in response to a processing request input regarding the virtual object displayed on the second display, the virtual object manager to output data corresponding to the virtual object subject to the processing request to a data processor that performs data processing using the first display or a memory accessible to the data processor.

Note that the program of the invention is a program that can be provided to an image processing apparatus or computer system capable of executing various program codes, through a storage medium or communication medium that can provide the program in a computer-readable format. Providing such a program in a computer-readable format enables a processing according to the program to be performed on the image processing apparatus or computer system.

Other objects, features and advantages of the invention will be apparent from the following detailed description based on embodiments of the invention and accompanying drawings. Note that, as used herein, a "system" is a logically aggregated configuration of a plurality of units and is not limited to component units within one and the same chassis.

Advantage of the Invention

According to a configuration of one embodiment of the invention, for example, in data processing using a PC, data that is not displayed on the display of the PC, such as data having been cut or copied, can be set as a virtual object and pasted on a finger of a hand of a user or the like to be always observable. According to this configuration, data that is not displayed on the display area of the PC can be pasted on a space other than the display area of the PC and displayed to be observable, which allows improving of the efficiency of data processing.

BRIEF DESCRIPTION OF THE DRAWINGS

FIG. 6 A diagram illustrating an example of configuration of a table used in registering the setting of a virtual object paste position performed by the information processing apparatus of the invention.

MODE FOR CARRYING OUT THE INVENTION

An information processing apparatus, an information processing method and a program in accordance with the invention are described below in detail with reference to the drawings.

The invention is described in order according to the following items.

1. Configuration example and processing example of information processing apparatus of the invention 2. Sequence example of processing performed by information processing apparatus of the invention 3. Example of real object on which virtual object is to be pasted

[1. Configuration Example and Processing Example of Information Processing Apparatus of the Invention]

Figure 1:
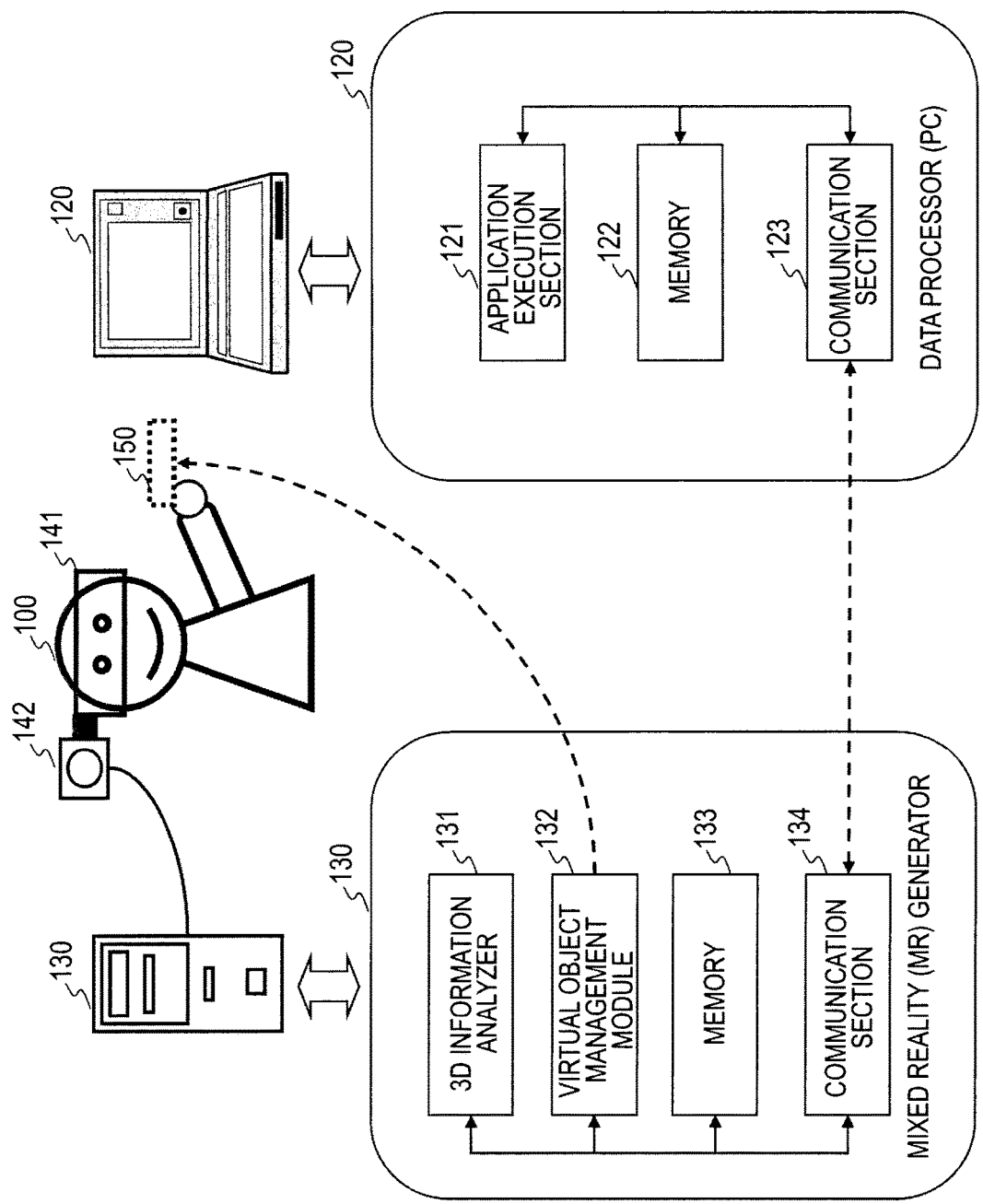
FIG. 1 A diagram illustrating a configuration of one embodiment of an information processing apparatus of the invention.

A configuration example and a processing example of an information processing apparatus of the invention are described with reference to the figures beginning with FIG. 1. FIG. 1 shows a configuration example of the information processing apparatus of the invention.

A user 100 can operate a personal computer (PC) 120 to perform various data processings. As shown, the PC 120 includes an application execution section 121, a memory 122 and a communication section 123. The application execution section 121 executes an application program specified by the user. For example, the application programs include a document creation application and a drawing application. The memory 122 includes a RAM, a ROM and the like and is used as a storage area and working area for the application program. For example, the memory 122 is also used as a storage area for processed data in processings such as copy and cut as described later. The communication section 123 performs processing of communicating with a Mixed Reality (MR) generator 130.

The user 100 wears glasses 141 including a display for displaying a virtual object. The glasses 141 includes a camera 142 for shooting the ambient environment. The glasses 141 and the camera 142 are connected to the Mixed Reality (MR) generator 130. The user 100 performs a task while observing an image displayed on the display provided on the glasses 141.

The display of the glasses 141 displays a real-world image shot by the camera 142, and further displays a virtual object generated by the Mixed Reality (MR) generator 130 in conjunction with the real-world image.

In the example in FIG. 1, the user 100 operates the personal computer (PC) 120 and the camera 142 shoots the personal computer (PC) 120 operated by the user 100. Accordingly, the display of the glasses 141 displays as real-world image, for example, an image including the display of the personal computer (PC) 120 operated by the user 100 and various real objects around the display. Furthermore, the virtual object generated by the Mixed Reality (MR) generator 130 is displayed superimposed on the real-world image. The orientation of the camera 142 changes in response to the movement of the user 100. For example, when the user looks at his/her hand, the display of the glasses 141 displays an image of the hand as real-world image in conjunction with which the virtual object is displayed. For example, a combined image of a real object and a virtual object as shown in FIG. 2 is displayed as a displayed image 200.

Figure 2:
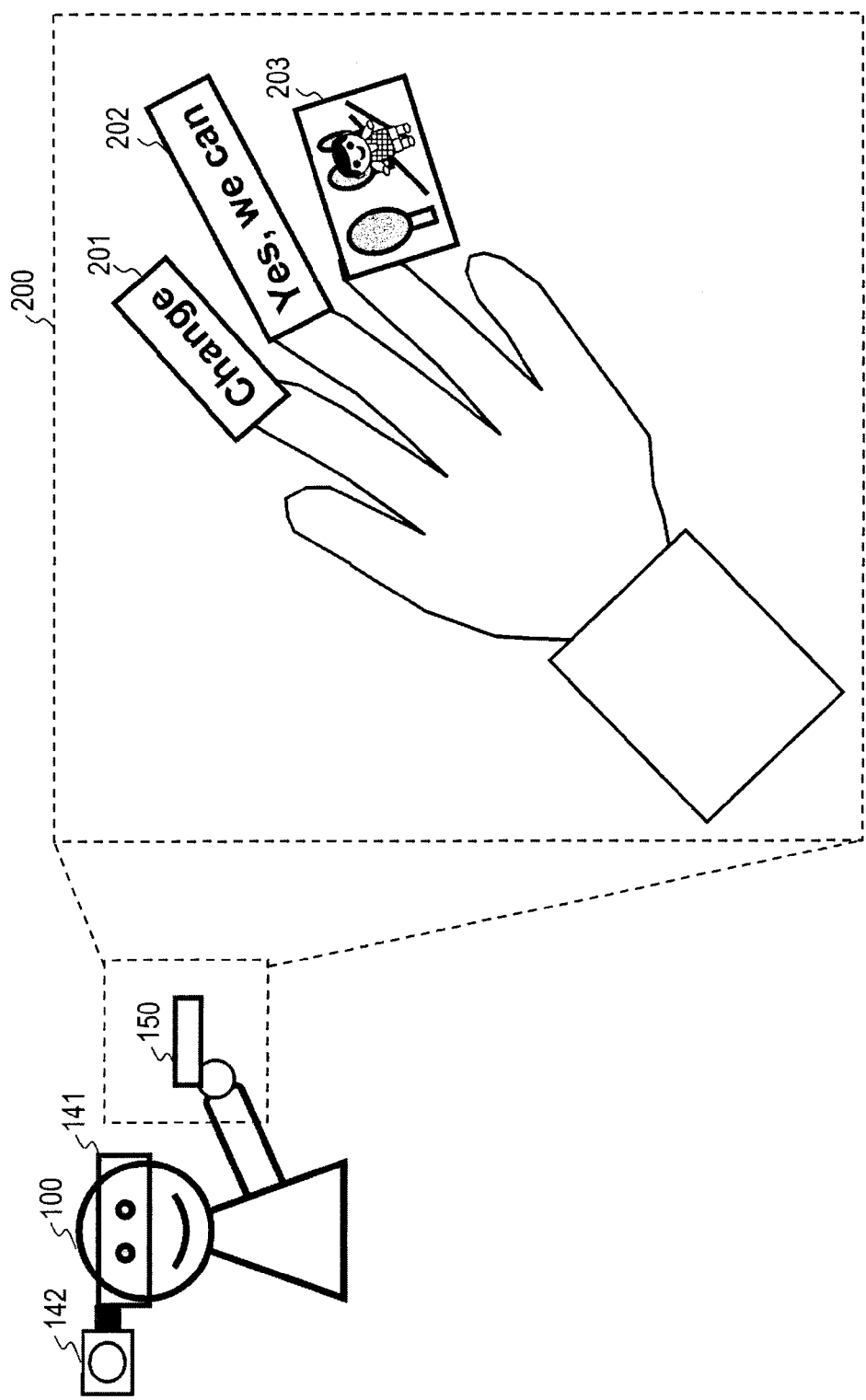
FIG. 2 A diagram illustrating an example of virtual object displaying performed by the information processing apparatus of the invention.

Prior to describing FIG. 2, the configuration of the Mixed Reality (MR) generator 130 shown in FIG. 1 is described. As shown in FIG. 1, the Mixed Reality (MR) generator 130 includes a 3D information analyzer 131, a virtual object management module 132, a memory 133 and a communication section 134.

The 3D information analyzer 131 receives the image shot by the camera 142 worn by the user and analyzes the 3D position of an object included in the shot image. This 3D position analysis is performed by applying, for example, simultaneous localization and mapping (SLAM). SLAM is a processing of picking a characteristic point from various real objects included in a camera-shot image and detecting the position of the picked characteristic point in conjunction with the position and attitude of the camera. Note that SLAM is described in the aforementioned Patent Document 1 (JP-A-2008-304268) and Patent Document 2 (JP-A-2008-304269). Also the basic processing of SLAM is described in Andrew J. Davison, "Real-time Simultaneous localisation and mapping with a single camera", Proceedings of the 9th International Conference on Computer Vision, Ninth, (2003).

The 3D information analyzer 131 calculates the 3D position of the real objects included in the image shot by the camera 142 worn by the user, by applying, for example, the aforementioned SLAM. However, the 3D information analyzer 131 may be configured to determine the 3D position of an object included in a camera-shot image using any other method than the aforementioned SLAM.

The virtual object management module 132 manages a virtual object to be displayed on the display of the glasses 141 worn by the user. The virtual object is data stored in the memory 133. Specifically, for example, the display of the glasses 141 worn by the user displays the displayed image 200 shown in FIG. 2. The image of the hand included in the displayed image 200 is a real image (real object) shot by the camera 142. In conjunction with this real image (real object), virtual objects 201-203 shown in FIG. 2 are displayed.

The user 100 shown in FIG. 1 can observe on the display of the glasses 141 an image of a virtual object 150 shown in FIG. 1 pasted on the hand of the user 100. The virtual object 150 shown in FIG. 1 corresponds to the virtual objects 201-203 shown in FIG. 2 and is not an object in the real world (real object).

The virtual objects 201-203 shown in FIG. 2, which are the data corresponding to the virtual object 150 shown in FIG. 1, are processed data having been copied or cut by the user through the PC 120. The processed data is stored in the memory 122 in the PC 120 through the processing by the application execution section 121 in the PC 120 according to the operation on the PC 120 by the user 100.

The data stored in the memory 122 is transmitted to the Mixed Reality (MR) generator 130 through the communication between the communication section 123 of the PC 120 and the communication section 134 of the Mixed Reality (MR) generator 130. The Mixed Reality (MR) generator 130 stores the data received from the PC 120 in the memory 133 in the Mixed Reality (MR) generator 130.

The virtual object management module 132 of the Mixed Reality (MR) generator 130 displays the data stored in the memory 133 as a virtual object on the display of the glasses 141 worn by the user. Specifically, for example, the virtual object management module 132 determines the display position of the virtual object and displays the virtual object at the determined display position.

In the example shown in FIG. 2, the three virtual objects 201-203 are displayed with their display positions set on the respective fingertips of the [hand] of the user displayed as real-world image.

The virtual object 201 [Change];

the virtual object 202 [Yes, we can]; and the virtual object 203 [photo image].

All of these are the data having been cut or copied and stored in the memory 122 of the PC 120 by the user 100 through the PC 120. These data are transmitted to the Mixed Reality (MR) generator 130 by communication and stored in the memory 133 of the Mixed Reality (MR) generator 130. The virtual object management module 132 of the Mixed Reality (MR) generator 130 sets the data stored in the memory 133 as a virtual object, determines the display position of each virtual object and displays the virtual object on the display of the glasses 141 worn by the user.

Although the apparatus shown in FIG. 1 includes the PC 120 and the Mixed Reality (MR) generator 130 as separate two units in data communication with each other, the PC 120 and the Mixed Reality (MR) generator 130 can also be integrated as one unit, in which the communication sections shown in FIG. 1 can be omitted. For example, the PC 120 can also include the 3D information analyzer 131 and virtual object management module 132 of the Mixed Reality (MR) generator 130 to perform the processings in one PC.

That is, although the personal computer (PC) 120 and the Mixed Reality (MR) generator 130 are shown in FIG. 1, the information processing apparatus of the invention may be one unit of the Mixed Reality (MR) generator 130 shown in FIG. 1 or may be two separate units of the Mixed Reality (MR) generator 130 and PC 120. Or the information processing apparatus may be one unit having the functions of the two units.

Figure 3:
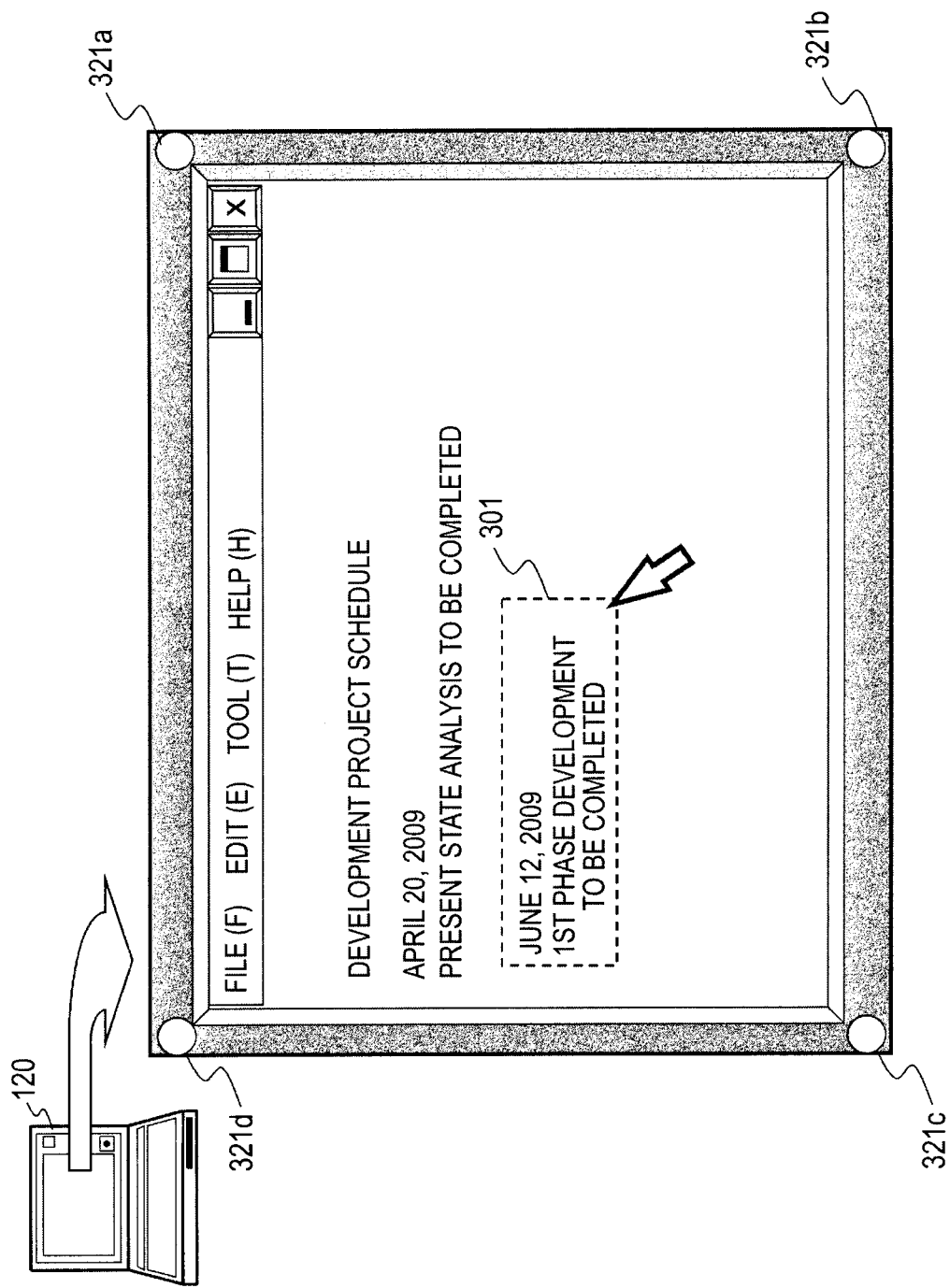
FIG. 3 A diagram illustrating an example of processing performed by the information processing apparatus of the invention.

A specific example of processing to which the configuration in FIG. 1 is applied is described with reference to the figures beginning with FIG. 3. For example, the user 100 is running a document creation application in the application execution section 121 of the PC 120 and creating a document as shown in FIG. 3. Here, when the user 100 sets a data area 301 and inputs a cut command, data in the data area 301 is stored in the memory 122 of the PC 120. Then, the data is transmitted to the Mixed Reality (MR) generator 130 by communication and stored in the memory 133 of the Mixed Reality (MR) generator 130.

The 3D information analyzer 131 of the Mixed Reality (MR) generator 130 receives the image shot by the camera 142 worn by the user 100 and calculates the 3D position of an object included in the shot image by applying, for example, SLAM. For example, the 3D information analyzer 131 selects markers 321*a-d* set at four corners of the display of the PC shown in FIG. 3 as characteristic points and calculate the 3D positions of the characteristic points.

Although, in the example shown in FIG. 3, the markers 321*a-d* are set for the identification of the characteristic points, the setting of such markers is not required. Alternatively, the 3D information analyzer 131 can detect the shape of an object, for example, the corners of the object from the image and select the detected corners as characteristic points to determine the 3D position of the characteristic points. Note that the detection of the corners can be performed through a characteristic point extraction using existing Harris Corner Detector.

Note that the 3D information analyzer 131 may also be configured to detect a specific object from a shot image. Specifically, the 3D information analyzer 131 can include a hand recognition module that recognizes a hand or finger of a human. The hand recognition module detects an object to be determined as a hand or finger of a human using image analysis. Such a specific object detection module keeps characteristic information on a specific object (e.g., a hand or finger of a human) and, when an object having that characteristic information is detected from an image, determines the detected object as the specific object.

"Handy AR: Markerless Inspection of Augmented Reality Objects Using Fingertip Tracking" discloses a finger recognition algorithm. For example, the 3D information analyzer 131 is configured to include a module that executes the algorithm described in this document to perform processing of recognizing a hand or finger of a human.

By calculating the 3D position of each finger of the hand of the user from an image shot by the camera 142 and displaying the image with a virtual object pasted on the position of each finger, the displayed image 200 as previously described with reference to FIG. 2 can be generated.

The virtual object management module 132 obtains 3D position information of a real object included in a camera-shot image from the 3D information analyzer 131. For example, the virtual object management module 132 obtains position information of each finger of the user. Furthermore, the virtual object management module 132 obtains data having been cut or copied and stored in the memory 133, then sets the obtained data as a virtual object, and then displays an image with the virtual object pasted on the position of each finger of the user on the display of the glasses 141 worn by the user 100.

Figure 4:
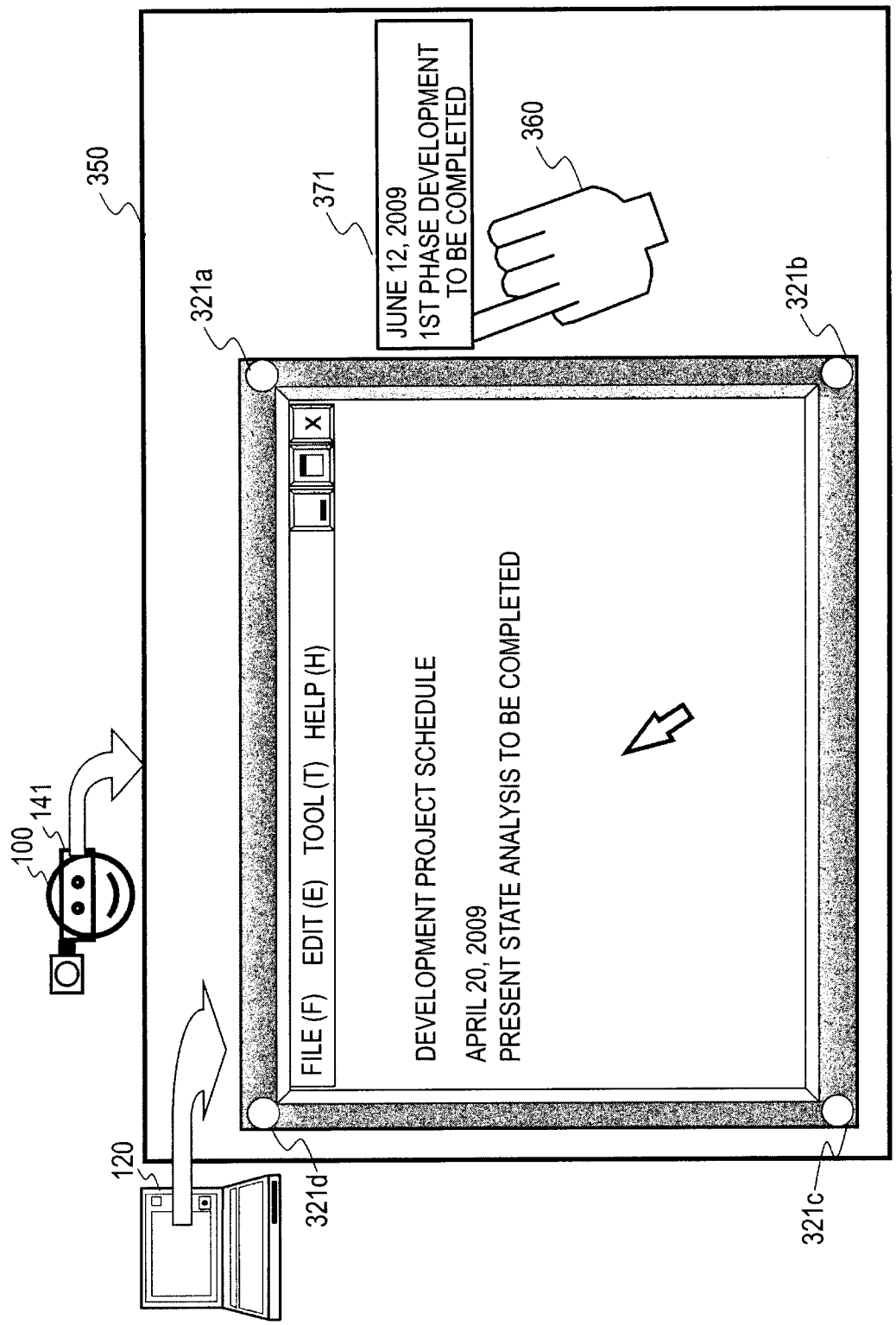
FIG. 4 A diagram illustrating an example of virtual object displaying performed by the information processing apparatus of the invention.

FIG. 4 shows an example of data displayed on the display of the glasses 141 worn by the user 100 when the data area 301 shown in FIG. 3 is cut by the user and set as a virtual object. A displayed image 350 shown in FIG. 4 is an image displayed on the display of the glasses 141 worn by the user 100.

The image of the display with the markers 321*a-d* set is a real image of the PC 120 operated by the user 100. This is the real image shot by the camera 142. Also, a hand 360 is an image of an actual hand of the user. In conjunction with this real image, a virtual object 371 is displayed. The virtual object 371 is data having been processed by the user 100 through the PC 120, for example, data having been cut or copied.

The virtual object 371 is the data stored in the memory 133 of the Mixed Reality (MR) generator 130. The virtual object management module 132 obtains from the 3D information analyzer 131 the 3D position information of the real object (the finger of the hand of the user) included in the camera-shot image and sets the display position of the virtual object 371 to a position corresponding to the obtained position information of the real object to perform display processing.

By these processings, the user 100 can always confirm the data having been removed from the display area of the PC 120, as the virtual object 371.

[2. Sequence Example of Processing Performed by Information Processing Apparatus of the Invention]

Figure 5:
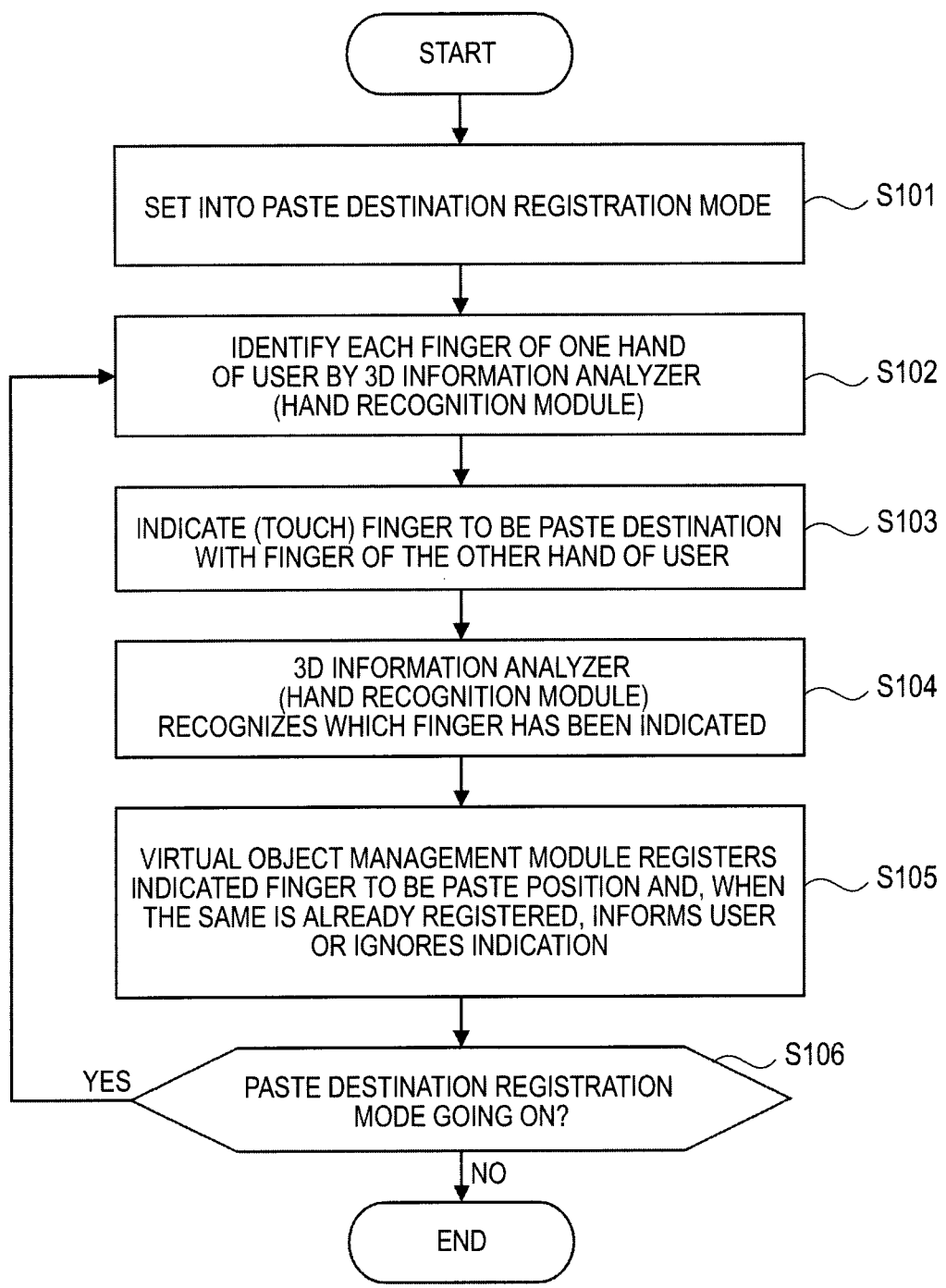
FIG. 5 A diagram showing a flowchart illustrating a process sequence of registering the setting of a virtual object paste position performed by the information processing apparatus of the invention.
Figure 7:
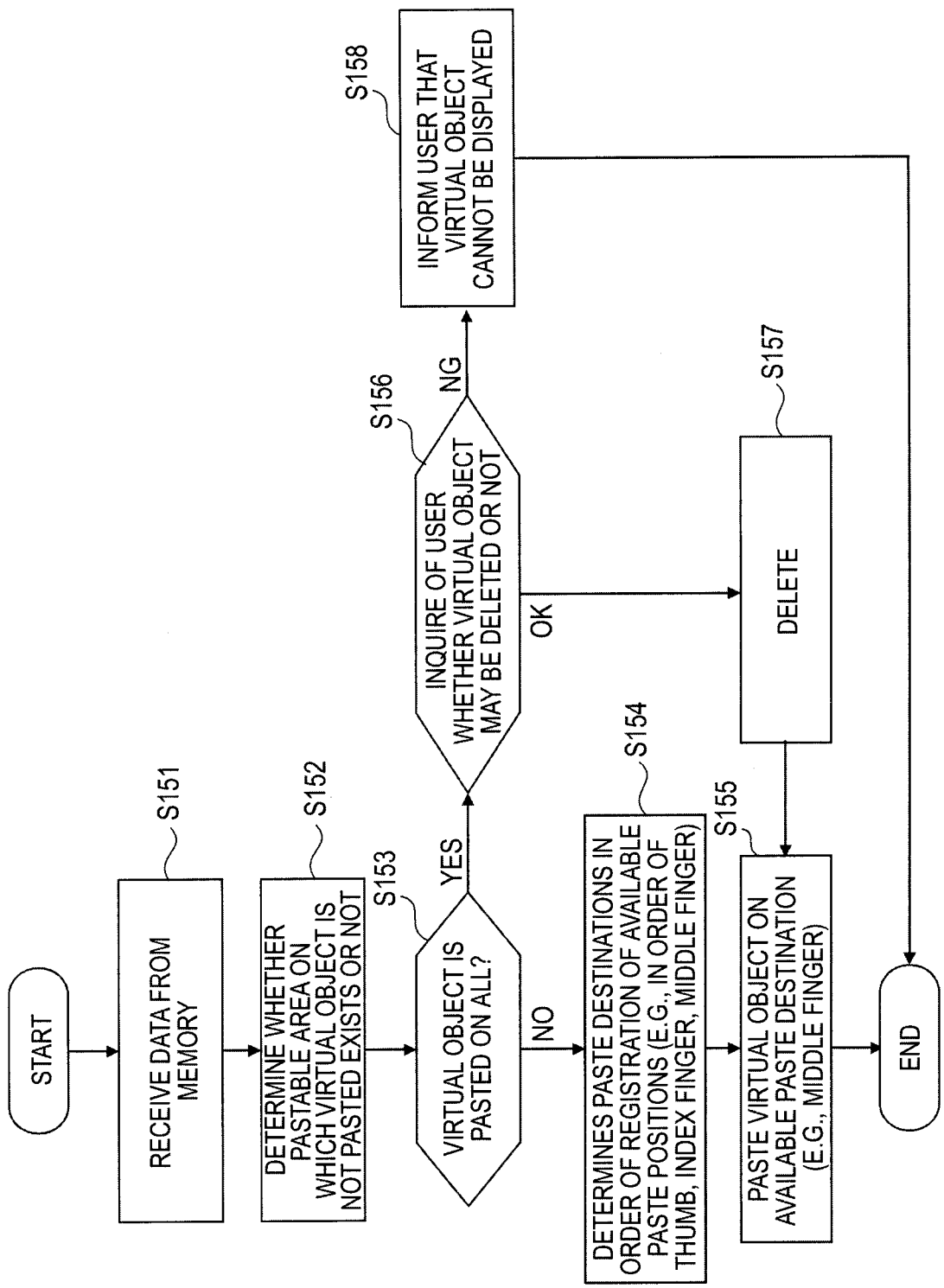
FIG. 7 A diagram showing a flowchart illustrating a process sequence of pasting a virtual object performed by the information processing apparatus of the invention.
Figure 8:
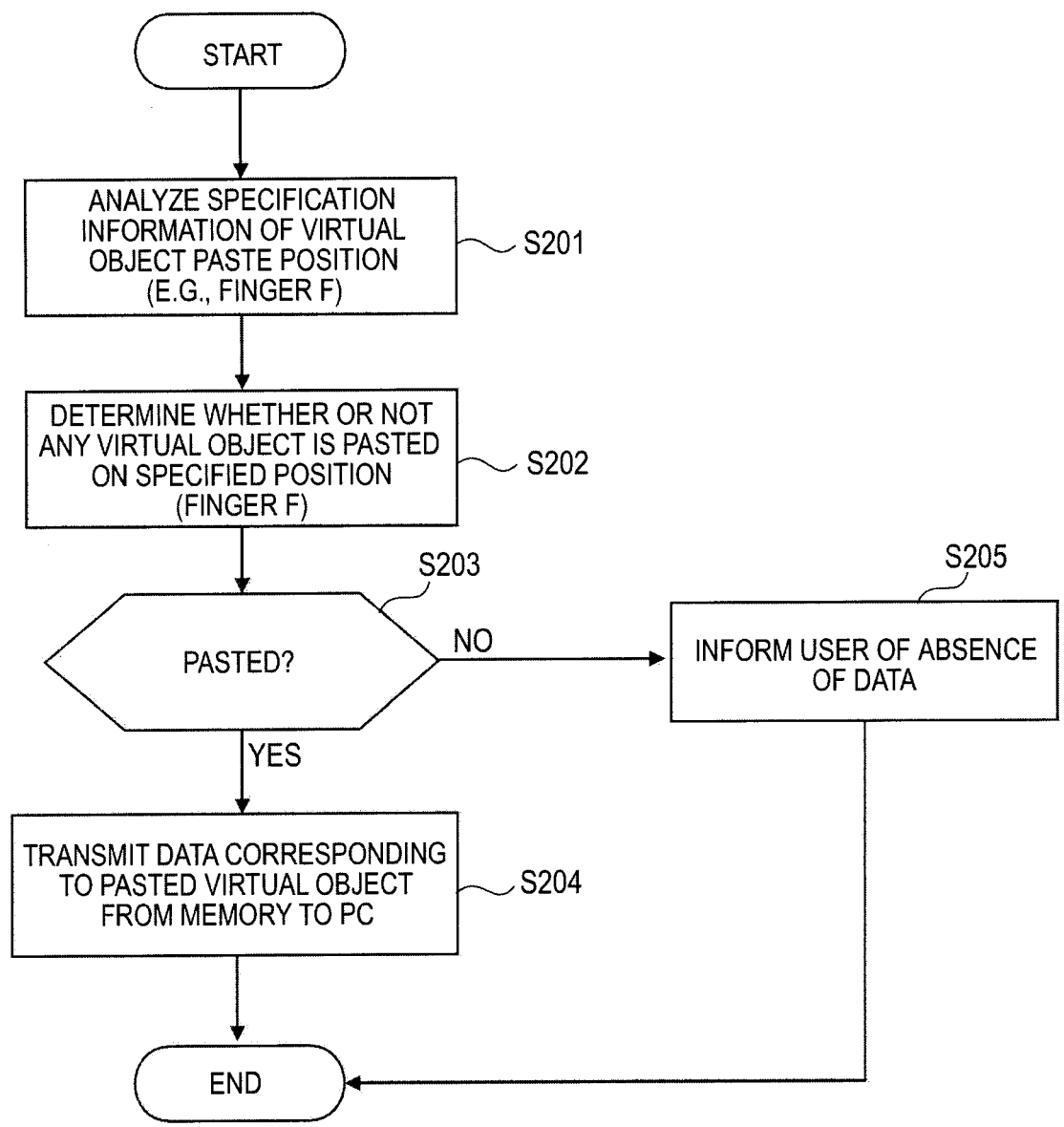
FIG. 8 A diagram showing a flowchart illustrating a sequence of data processing using data corresponding to a virtual object performed by the information processing apparatus of the invention.
Figure 9:
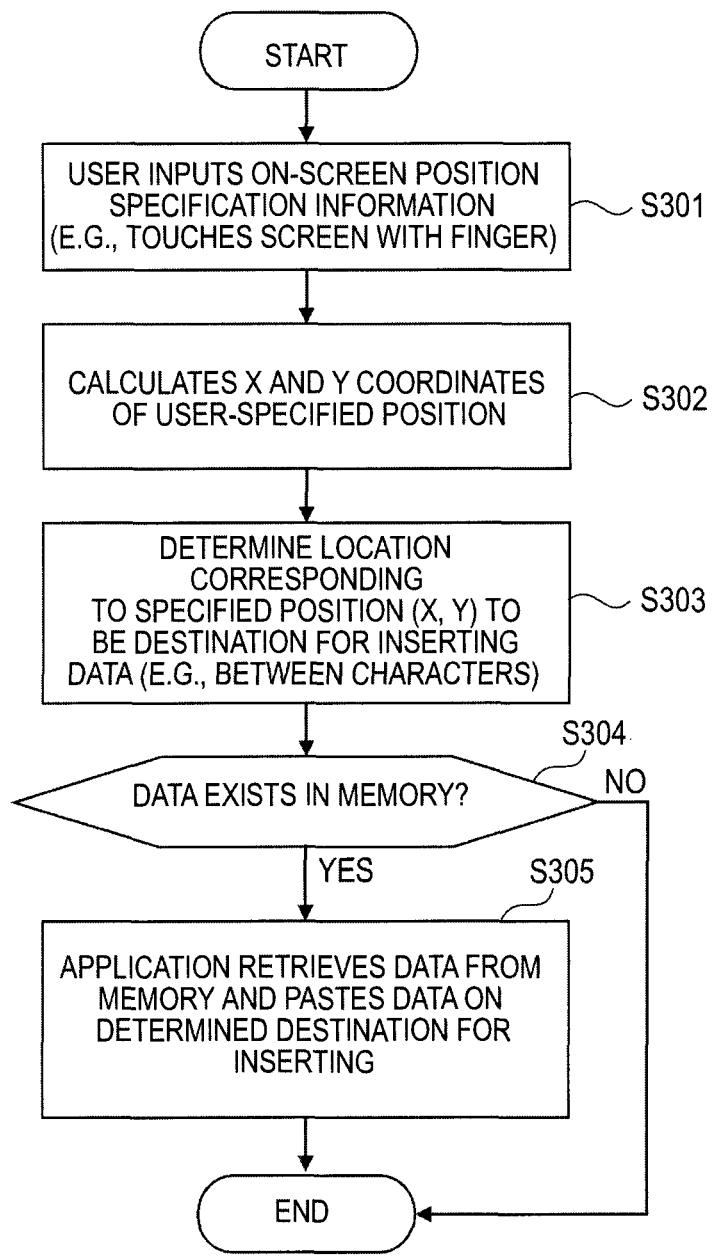
FIG. 9 A diagram showing a flowchart illustrating a sequence of data processing using data corresponding to a virtual object performed by the information processing apparatus of the invention.

Next, a process sequence including a processing of setting each finger of the user as a virtual object paste/display position and a processing of displaying the virtual object is described with reference to flowcharts shown in the figures beginning with FIG. 5. The process sequence described below includes the following processes:

(a) a process of registering the setting of each finger of the user as a virtual object paste/display position (FIG. 5);

(b) a process of pasting the virtual object on each finger of the user and displaying them (FIG. 7);

(c) a process by the Mixed Reality (MR) generator 130 in using the virtual object set for the finger of the user as data to be processed by the PC (i.e., in pasting the virtual object) (FIG. 8); and (d) a process by the PC 120 in using the virtual object set for the finger of the user as data to be processed by the PC (i.e., in pasting the virtual object) (FIG. 9).

(a) a process of registering the setting of each finger of the user as a virtual object paste/display position To begin with, the process of registering the setting of each finger of the user as a virtual object paste/display position is described with reference to the flowchart shown in FIG. 5. This process is performed on the side of the Mixed Reality (MR) generator 130.

First, in step S101, the Mixed Reality (MR) generator 130 is set into a paste destination registration mode. Although not shown in the Mixed Reality (MR) generator 130 shown in FIG. 1, the Mixed Reality (MR) generator 130 includes an input section for performing mode setting and the like, allowing mode setting by user operation.

Next, in step S102, the 3D information analyzer (hand recognition module) 131 analyzes an image input from the camera 142 and analyzes the 3D position of a real object included in the image. In this example, the real object with the 3D position to be analyzed is each finger of a hand of the user. The 3D information analyzer (hand recognition module) 131 discriminates each finger of one hand of the user and also analyzes the 3D position of the each finger.

In step S103, the user indicates (touches) a finger to be a paste destination using a finger of the other hand. Then, in step S104, the 3D information analyzer (hand recognition module) 131 recognizes which finger has been indicated, through image analysis. The 3D information analyzer (hand recognition module) 131, already having discrimination information on fingers of human, can perform discrimination such as whether the finger indicated by the user is the thumb or the other fingers. The 3D information analyzer (hand recognition module) 131 outputs information on the finger indicated by the user to be the virtual object paste position, to the virtual object management module 132.

Next, in step S105, the virtual object management module 132 registers the finger indicated to be the virtual object paste position informed by the 3D information analyzer (hand recognition module) 131. Note that, when the indicated finger is already registered as the virtual object paste position, the virtual object management module 132 informs the user that the indicated finger is already registered. The virtual object management module 132 ignores the indication and does nothing.

The virtual object management module 132 stores in the memory 133 and manages a virtual object information management table that includes as management information the position information registered as the virtual object paste position and the state information on whether or not a virtual object is already pasted on that paste position. For example, the virtual object information management table is a management table that stores information as shown in FIG. 6. The virtual object management module 132 performs the processing while appropriately updating and referring to this virtual object information management table.

In step S106, it is determined whether the paste destination registration mode is going on or not. If determined it is going on, the processing of steps S102-S106 is repeated. In step S106, if the paste destination registration mode is not going on, the registration ends.

Figure 10:
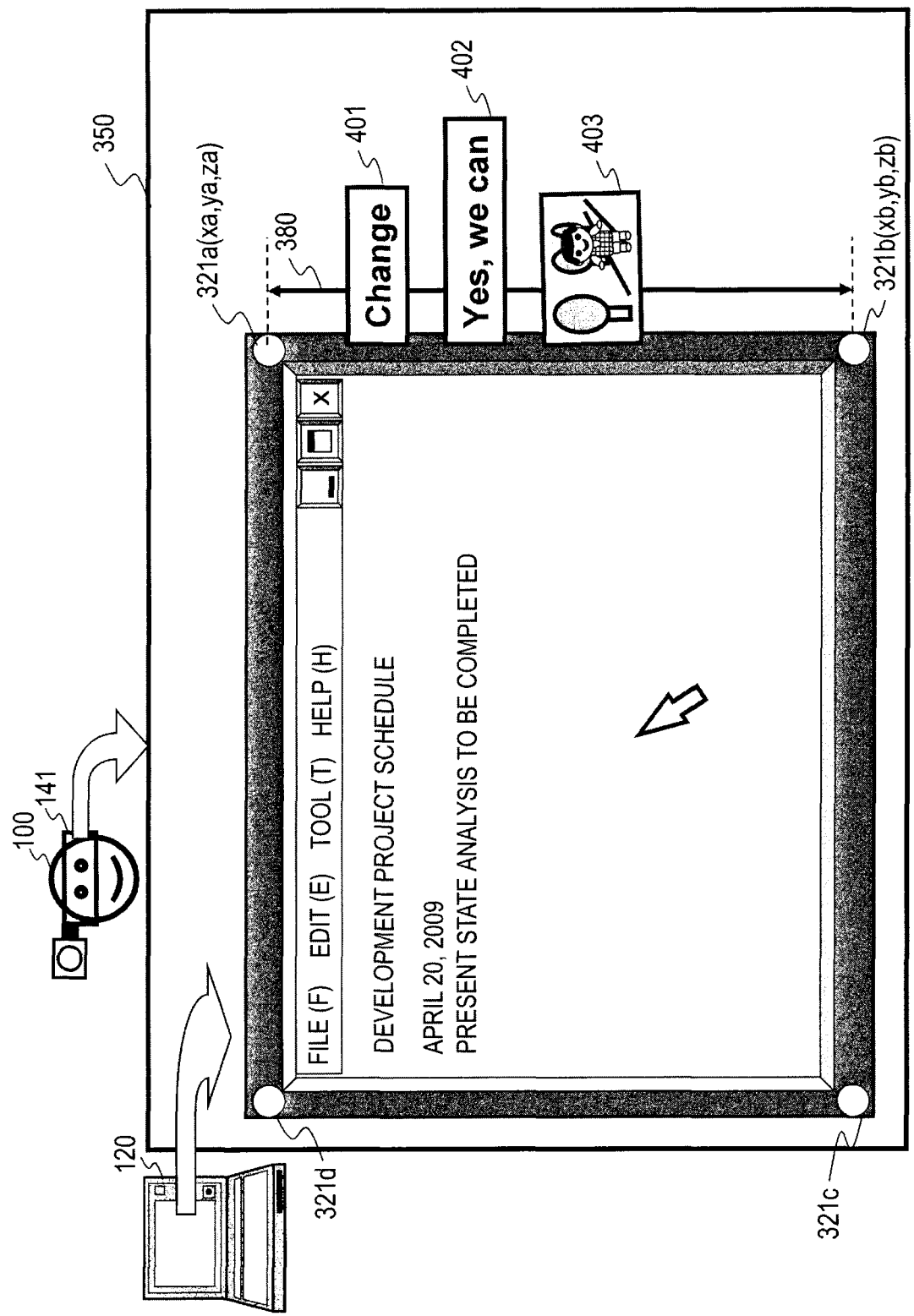
FIG. 10 A diagram illustrating an example of virtual object displaying performed by the information processing apparatus of the invention.

Although, in the process in FIG. 5, a finger of a hand is set as the virtual object paste destination, any other object can be set as the virtual object paste destination. For example, as described later, as shown in FIG. 10, a processing such as setting the frame of the PC as the virtual object paste position can also be performed.

Next, a virtual object paste process sequence using the virtual object paste destination registered according to the flow shown in FIG. 5 is described with reference to the flowchart shown in FIG. 7. The flow shown in FIG. 7 is a process of pasting the virtual object on each finger of the user to display them on the display of the glasses 141 worn by the user 100. This process is performed on the side of the Mixed Reality (MR) generator 130 shown in FIG. 1.

First, in step S151, the virtual object management module 132 of the Mixed Reality (MR) generator 130 obtains the data stored in the memory 133 of the Mixed Reality (MR) generator 130. Note that this data is the processed data received from the PC 120 through the communication section 134 under the control of a controller of the Mixed Reality (MR) generator 130. That is, this data is the data having been cut or copied by the user through data processing on the PC 120.

Next, in step S152, the virtual object management module 132 determines whether any available paste position on which a virtual object is not pasted exists or not. This processing may be performed by the 3D information analyzer 131 using analysis information based on the image obtained by the camera 142 or may be performed referring to the virtual object information management table previously described with reference to FIG. 6.

In step S153, it is determined whether or not a virtual object is pasted on all of the registered virtual object paste positions. If a virtual object is pasted on all of the registered virtual object paste positions, the result of step S153 is Yes and the process proceeds to step S156. On the other hand, if any available virtual object paste position exists, the result of step S153 is No and the process proceeds to step S154.

For example, in the case of referring to the virtual object information management table in which registration information shown in FIG. 6 is set, the entries beginning with (3) would be detected as available virtual object paste positions on which a virtual object is not pasted at this time. In this case, since an available virtual object paste position exists, the result of step S153 is No and the process proceeds to step S154.

In step S154, the paste destinations are determined in the order of registration of the available paste positions (e.g., in the order of thumb, index finger, middle finger). Note that the setting of paste positions may be configured to be user-selectable.

Next, in step S155, the virtual object management module 132 pastes the data obtained from the memory in previous step S151 on the selected virtual object paste position.

The 3D information analyzer 131 always analyzes an image input from the camera 142 to be aware of the 3D position of each finger of a hand that is a real object. The virtual object management module 132 displays a combined image of the real object and the virtual object on the display of the glasses 141 worn by the user 100 while dynamically changing the display position of the virtual object according to the position information of the finger input from the 3D information analyzer 131.

By this processing, the virtual object paste/display data described with reference to FIGS. 2 and 4, for example, is displayed on the display of the glasses 141 worn by the user.

Next, a processing in the case that the result of step S153 is Yes is described. In this case, a virtual object is pasted on all of the registered virtual object paste positions, so the result of step S153 is Yes and the process proceeds to step S156.

In step S156, an inquiry is made of the user. Specifically, the user is inquired whether a virtual object may be deleted or not. For example, this inquiry may transmit a message through the communication sections to the PC 120 operated by the user and display the massage on the display of the PC. Or the inquiry may output a massage using an output section (speaker or display) of the Mixed Reality (MR) generator 130. Note that the processing of selecting a virtual object to be deleted may be, for example, a processing of sequentially inquiring of the user whether a virtual object may be deleted or not, in the order from the earliest pasted virtual object. Or the processing may be a processing of selecting a virtual object to be deleted, according to the specification information in which a virtual object that may be deleted is specified by the user among a plurality of pasted virtual objects.

If the user permits the deletion by user input, the process proceeds to step S157 to perform the deletion of the virtual object. Note that the user input may be performed through the PC 120 or may be through the input section of the Mixed Reality (MR) generator 130. Or the user input may be performed using analysis based on the image shot by the camera 142 and obtained by the 3D information analyzer 131 of the Mixed Reality (MR) generator 130, for example, the specification information of a virtual object that may be deleted, specified by the user.

When the deletion is performed, the process proceeds to step S155. In step S155, the virtual object management module 132 pastes the data obtained from the memory in previous step S151 on the available virtual object paste position set through the deletion. By this processing, the virtual object paste/display data described with reference to FIGS. 2 and 4, for example, is displayed on the display of the glasses 141 worn by the user.

On the other hand, in step S156, if user does not permit the deletion, the process proceeds to step S158. In step S158, a processing of informing the user that a new virtual object cannot be pasted and displayed is performed and the process ends. For example, this processing of informing the user may transmit a message through the communication sections to the PC 120 operated by the user and display the message on the display of the PC. Or the processing may output a massage using an output section (speaker or display) of the Mixed Reality (MR) generator 130.

Next, a process sequence of using a virtual object as data to be processed by the PC (i.e., pasting the virtual object) is described with reference to the flowcharts shown in FIGS. 8 and 9. This process consists of the Mixed Reality (MR) generator 130-side process and the PC 120-side process.

To begin with, the process in the Mixed Reality (MR) generator 130 is described with reference to the flowchart shown in FIG. 8. First, in step S201, the Mixed Reality (MR) generator 130 analyzes specification information of a virtual object paste position (e.g., a finger F).

While observing the display of the glasses 141, the user 100 specifies one virtual object among a plurality of virtual objects pasted on fingers of one hand of the user, for example, as shown in FIG. 2, using a finger of the other hand. The 3D information analyzer (hand recognition module) 131 analyzes an image input from the camera 142 and analyzes the user-specified position included in the image and the type of the finger at that position that is a real object. This information is provided to the virtual object management module 132.

Next, in step S202, the virtual object management module 132 determines whether any virtual object exists or not that is pasted on the user-specified position analyzed by the 3D information analyzer (hand recognition module) 131 (e.g., one of the fingers of the user). This processing can be performed referring to the virtual object information management table described with reference to FIG. 6, for example.

If a virtual object is pasted on the user-specified position, the result of step S203 is Yes and the process proceeds to step S204.

In step S204, the data corresponding to the virtual object pasted on the user-specified position is obtained from the memory 133 and transmitted through the communication section 134 to the PC 120.

In response to a processing request input by the user 100 regarding the virtual object displayed on the display of the glasses 141, the virtual object management module 132 outputs data corresponding to the virtual object subject to the processing request to a data processor that performs data processing using the PC 120 or a memory accessible to the PC 120.

In the configuration shown in FIG. 1, the Mixed Reality (MR) generator 130 outputs the data through the communication section 134 to the PC 120. The PC 120 receives the data from the Mixed Reality (MR) generator 130 and stores the data in the memory 122 of the PC 120.

On the other hand, if a virtual object is pasted on the user-specified position, the result of step S203 is No and the process proceeds to step S205.

In step S205, the user is informed that a virtual object is not pasted on the user-specified position. This informing is performed through the output section of the PC 120 or of the Mixed Reality (MR) generator 130.

Next, the process sequence on the PC 120-side to be performed after the process on the Mixed Reality (MR) generator 130-side shown in FIG. 8 is completed is described with reference to the flowchart shown in FIG. 9. The PC 120 receives the data to be processed from the Mixed Reality (MR) generator 130 and stores the data in the memory 122 of the PC 120.

First, in step S301, the user inputs on-screen position specification information to the PC 120. This is the position on which the data corresponding to the virtual object is to be pasted. For example, the specification is made using a mouse or keyboard. Or, if the display has a touch screen, the user touches the screen with a finger, then the touch position information is given by calculation.

In step S302, the application execution section 121 of the PC 120 calculates the coordinates (x, y) of the user-specified position on the display.

In step S303, a location corresponding to the specified position (x, y) is determined to be the destination for inserting the data. For example, the destination may be between characters.

In step S304, it is determined whether or not the data received from the Mixed Reality (MR) generator 130 to be processed exists in the memory 122 in the PC 120. If the data to be processed exists, the result of step S304 is Yes and the process proceeds to step S305 in which the application execution section 121 retrieves the data from the memory 122 and paste the data on the determined destination for inserting. If the data to be processed does not exist, the result of step S304 is No and the process ends without performing the processing in step S305.

In this way, the virtual object displayed on the glasses 141 worn by the user 100 is used as processed data of the PC 120 operated by the user in the real world.

[3. Example of Real Object on which Virtual Object is to be Pasted]

In the above embodiment, a finger of the hand of the user is used as the virtual object paste destination. However, the virtual object paste destination is not limited to the finger of the hand of the user and may be various real objects displayed on the glasses 141 worn by the user 100.

For example, as shown in FIG. 10, the outer frame of the PC 120 may also be set as the virtual object paste position. FIG. 10 shows a displayed image 350 displayed on the display of the glasses 141 worn by the user 100, as described with reference to FIG. 4.

The image of the display with the markers 321a-d set is a real image of the PC 120 operated by the user 100 and also a real image shot by the camera 142. In conjunction with this real image, virtual objects 401-403 are displayed. The virtual objects 401-403 are data having been processed by the user 100 through the PC 120, for example, data having been cut or copied.

In the example shown in FIG. 10, the paste positions of these virtual objects 401-403 are set to a section between the right markers 321a and 321b. Specifically, a virtual object paste section 380 indicated by an arrow in FIG. 10 is set. The real-space coordinates (xa, ya, za) of the marker 321a and the real-space coordinates (xb, yb, zb) of the marker 321b are determined, then the section from (xa, ya, za) to (xb, yb, zb) is equally divided into a plurality of sub-sections, and then each sub-section is set as a virtual object paste area.

Figure 11:
FIG. 11 A diagram illustrating an example of configuration of a table used in registering the setting of a virtual object paste position performed by the information processing apparatus of the invention.

In this case, the virtual object information management table would be set as shown in FIG. 11, for example. Note that the table shown in FIG. 11 also shows actual pasted virtual objects as reference data. Thus, various objects, not limited to the hand of the user, may be used as the virtual object paste position.

According to the configuration of the invention, a copied content can be confirmed without narrowing an information presentation screen, or showing the content of the copy buffer each time, or pasting and undoing. Also, when the user uses his/her fingers or body as a copy buffer, in order to copy a content from an information presentation screen and paste the content on another information presentation screen remotely located, the user can move to the destination screen to paste the content, allowing intuitive paste operation. Also, a 3D object is instantiated and displayed as a 3D object in the real world, which facilitates intuitive recognition of the shape and the like and specification of the orientation and the like in pasting.

The invention has been described above in detail with reference to the specific embodiments. However, it is apparent that modification and substitution may be implemented to the embodiments by those skilled in the art without departing from the spirit of the invention. In other words, the invention has been disclosed in an exemplary manner and should not be construed as restrictive. The scope of the invention is defined by the appended claims.

Also, a series of processings described herein may be implemented by hardware, software or a combination thereof. Software-implemented processing can be performed by installing a program in which a processing sequence is recorded into a memory in a computer built into a dedicated hardware and executing it or by installing a program into a general-purpose computer capable of performing various processings and executing it. For example, a program can be previously recorded in a recording medium. In addition to installing a program from a recording medium to a computer, a program can be received through a network, such as LAN (Local Area Network) and Internet, and installed into a recording medium, such as built-in hard disk or the like.

Note that the various processings described herein may be performed not only in time series according to the description but also in parallel or individually depending on the processing capability of processing units or if needed. Also, as used herein, a "system" is a logically aggregated configuration of a plurality of units and is not limited to component units within one and the same chassis.

INDUSTRIAL APPLICABILITY

As having been described, according to a configuration of one embodiment of the invention, for example, in data processing using a PC, data that is not displayed on the display of the PC, such as data having been cut or copied, can be set as a virtual object and pasted on a finger of a hand of a user or the like to be always observable. According to this configuration, data that is not displayed on the display area of the PC can be pasted on a space other than the display area of the PC and displayed to be observable, which allows improving of the efficiency of data processing.

DESCRIPTION OF REFERENCE NUMERALS AND SIGNS

100 user
120 personal computer (PC)
121 application execution section
122 memory
123 communication section
130 Mixed Reality (MR) generator
131 3D information analyzer
132 virtual object management module
133 memory
134 communication section
141 glasses
142 camera
150 virtual object
200 displayed image
201-203 virtual object
321a-321d marker
350 displayed image
360 hand
371 virtual object
380 virtual object paste section
401-403 virtual object

The invention claimed is:

1. An information processing apparatus, comprising: a memory configured to contain store a virtual object information management table; and
    at least one processor configured to:
    obtain display data that indicates a virtual object;
    detect a finger, of a hand of a user in a camera-shot image, touched by the user;
    analyze a position of the detected finger based on concurrent localization and mapping;
    determine whether the position of the detected finger is registered as a display position in the virtual object information management table;
    register the position of the detected finger as a position of the obtained display data in the virtual object information management table, wherein the registration is based on the determination that the position of the detected finger is unregistered as the display position;
    notify the user that the position of the detected finger is registered as the display position, wherein the notification is based on the determination that the position of the detected finger is registered as the display position; and
    inquire to the user whether to delete the display position from the virtual object information management table, wherein the inquiry is based on the determination that the detected finger is registered as the display position.

2. The information processing apparatus according to claim 1, wherein the at least one processor is further configured to control a display screen to display the virtual object to be superimposed at the position of the obtained display data.

3. The information processing apparatus according to claim 2, wherein the information processing apparatus is a head mounted apparatus, and
wherein the head mounted apparatus comprises the display screen.

4. The information processing apparatus according to claim 2, wherein the at least one processor is further configured to output data, that corresponds to the displayed virtual object, to a data processor of an external device based on a processing request associated with the displayed virtual object.

5. The information processing apparatus according to claim 4, wherein the at least one processor is further configured to obtain, as the display data, data that has been cut or copied from the external device.

6. The information processing apparatus according to claim 1, wherein the at least one processor is further configured to obtain specification information that is input by the user to specify the display position of the virtual object to be deleted from the virtual object information management table.

7. The information processing apparatus according to claim 1, wherein the at least one processor is further configured to register a plurality of positions of fingers, which are touched by the user, as display positions of a plurality of virtual objects in the virtual object information management table.

8. An information processing method, comprising:
obtaining display data indicating a virtual object;
detecting a finger, of a hand of a user in a camera-shot image, touched by the user;
analyzing a position of the detected finger based on concurrent localization and mapping;
determining whether the position of the detected finger is registered as a display position in a virtual object information management table;
registering the position of the detected finger as the display position of the obtained display data in the virtual object information management table, wherein the registration is based on the determination that the position of the detected finger is unregistered as the display position;
notifying the user that the position of the detected finger is registered as the display position, wherein the notification is based on the determination that the detected finger is registered as the display position; and
inquiring to the user whether to delete the display position from the virtual object information management table, wherein the inquiry is based on the determination that the detected finger is registered as the display position.

9. A non-transitory computer-readable medium having stored thereon computer-executable instructions that, when executed by a processor, cause a computer to perform operations, the operations comprising:
obtaining display data indicating a virtual object;
detecting a finger, of a hand of a user in a camera-shot image, touched by the user;
analyzing a position of the detected finger based on concurrent localization and mapping;
determining whether the position of the detected finger is registered as a display position in a virtual object information management table;
registering the position of the detected finger as a position of the obtained display data in the virtual object information management table, wherein the registration is based on the determination that the position of the detected finger is unregistered as the display position;
notifying the user that the position of the detected finger is registered as the display position, wherein the notification is based on a determination that the touched finger is registered as the display position; and
inquiring to the user whether to delete the display position from the virtual object information management table, wherein the inquiry is based on the determination that the detected finger is registered as the display position.

* * * * *